G. R. MOORE.
MACHINES FOR HEADING BOLTS.
No. 187,294.   Patented Feb. 13, 1877.
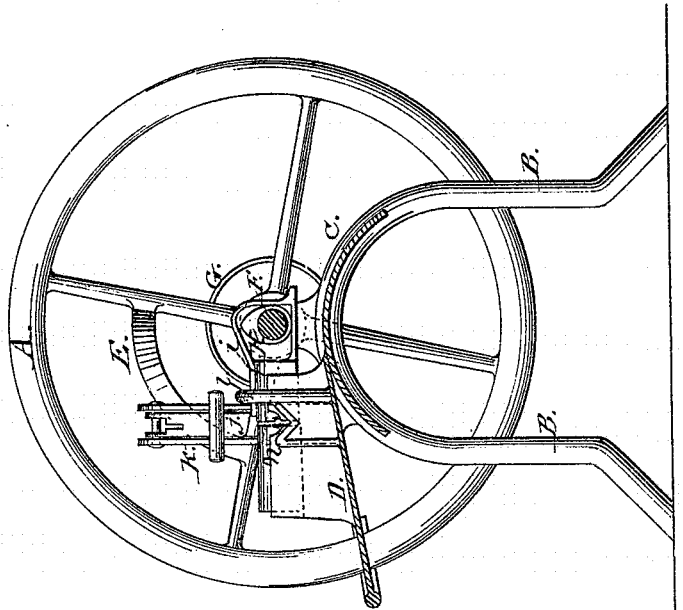
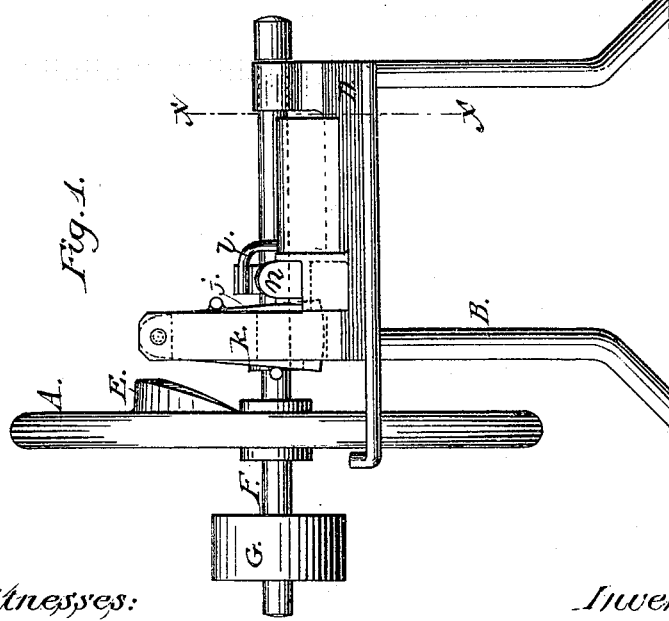
Witnesses:  
Inventor:  
Geo. R. Moore

UNITED STATES PATENT OFFICE

GEORGE R. MOORE, OF PHILADELPHIA, PENNSYLVANIA.

IMPROVEMENT IN MACHINES FOR HEADING BOLTS.

Specification forming part of Letters Patent No. 187,294, dated February 13, 1877; application filed August 7, 1874.

*To all whom it may concern:*

Be it known that I, GEO. R. MOORE, of Philadelphia, in the State of Pennsylvania, have invented a Heading-Machine, of which the following is a specification:

The object of my invention is to provide a heading-machine, at a moderate cost, suitable for making the required heads upon stove-rods, or any other bolts for which it may be made capable.

Figure 1 is a side elevation. Fig. 2 is a sectional elevation, taken crosswise to Fig. 1 in the line $x\ x$.

A is a fly-wheel; B, C, D, $l$, and $k$, frame-work for supporting the respective parts of the operating-machinery. F is a shaft hung in ordinary journals in the frame-work. G is a pulley. J is a suspended heading-tool, jointed in the upper part of the frame $k$, in which it moves freely just the distance that it is desired to upset the rod in forming a head upon it; and this distance of the swing of the tool may be graduated by any of the ordinary means in similar cases. $i$ is a sliding clamp or die, moving in the frame-work $l$ beneath, and meeting a similar die, $n$, which does not move; but the two coming together face to face agree in presenting each one a half-circled groove, in which the rod to be headed is clamped exactly in front of the heading-tool $j$. This sliding die $i$ is operated by the cam H upon the shaft F.

It will be seen that the cam E, upon the wheel A, is so situated that it will bring up the heading-tool to its extreme closeness to the dies $i\ n$ at the moment the dies are held closest together by the cam H.

The whole operation will now be easily understood.

The rod to be headed is placed in the groove in the frame-work, which guides between the clamping-dies, where they are hollowed out to receive it. As the shaft F revolves, the cam H thereon alternately opens and closes the dies. When they are open the rod is slipped in against the heading-tool, and instantly the cam H forces the die $i$ against the rod, holding it firmly, and, at the same moment, the cam E forces the heading-tool $j$ up close to the dies, upsetting the end of the rod, and forming a head, and thus the work is completed.

When it is expected that the machine may be wanted for heading more than one given size of rod, the dies, and also the heading-tool, should be made with removable faces. It may also be desirable to place back of these faces strong springs, to make them self-adjusting where the sizes of rods vary but slightly, and not enough to require a change of dies.

I claim—

The combination, with the shaft F, provided with the cam H, of the clamping-dies $i\ n$, swinging heading-tool $j$, and balance-wheel A, carrying cam E, substantially as herein shown and described.

GEO. R. MOORE.

Witnesses:
WM. H. MINNIX,
GEORGE T. MASON.